(12) United States Patent
Felicioni (10) Patent No.: US 10,968,002 B2
(45) Date of Patent: Apr. 6, 2021

(54) TRANSLUCENT HEAT SEAL MATERIAL FOR LOW TEMPERATURE APPLICATIONS

(71) Applicant: AVERY DENNISON RETAIL INFORMATION SERVICES, LLC, Mentor, OH (US)

(72) Inventor: Andrea Felicioni, Spinetoli (IT)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 130 days.

(21) Appl. No.: 15/955,904

(22) Filed: Apr. 18, 2018

(65) Prior Publication Data

US 2018/0297736 A1   Oct. 18, 2018

Related U.S. Application Data

(60) Provisional application No. 62/486,670, filed on Apr. 18, 2017.

(51) Int. Cl.
*B32B 41/00* (2006.01)
*B65C 9/18* (2006.01)
(Continued)

(52) U.S. Cl.
CPC .......... *B65C 9/1869* (2013.01); *B65C 1/021* (2013.01); *B65C 9/30* (2013.01); *B65C 9/42* (2013.01); *C09J 7/21* (2018.01); *C09J 7/35* (2018.01); *G09F 3/10* (2013.01); *B65C 2009/0084* (2013.01); *C09J 2203/334* (2013.01); *C09J 2301/18* (2020.08); *C09J 2301/304* (2020.08); *C09J 2400/263* (2013.01); *C09J 2475/00* (2013.01); *C09J 2475/006* (2013.01)

(58) Field of Classification Search
CPC .......... B65C 9/1869; B65C 9/30; B65C 9/42; B65C 1/021; B65C 2009/0084; C09J 7/21; C09J 7/35; C09J 2475/00; C09J 2400/263; C09J 2201/20; C09J 2203/334; C09J 2201/61; C09J 2475/006; G09F 3/10
USPC .............. 156/60, 64, 350, 351, 378, 379
See application file for complete search history.

(56) References Cited

U.S. PATENT DOCUMENTS

2010/0267302 A1   10/2010   Kantner et al.
2012/0175053 A1*   7/2012   Metsajoki ........... G09F 3/10
                                                                156/272.2

FOREIGN PATENT DOCUMENTS

WO   WO-0065559 A1 *  11/2000   ............... G09F 3/10
WO   2011/036347            3/2011

OTHER PUBLICATIONS

International Search Report and Written Opinion dated Aug. 1, 2018 issued in corresponding IA No. PCT/US2018/028074 filed Apr. 18, 2018.

(Continued)

*Primary Examiner* — Michael N Orlando
*Assistant Examiner* — Joshel Rivera (57) ABSTRACT

A label material attachable to a product, and a method of applying the label material to the product is described herein. Printed indicia, such as brand identifiers or other labeling information, are applied to the substantially transparent label material using a thermal or other suitable printer. The label material is then bonded to the product using a low heat and pressure technique to activate the adhesive. Once applied to the product, a portion of the label material bonded to the product substantially blends into the product leaving only the printed indicia readily visible to a consumer.

15 Claims, 5 Drawing Sheets

(51) Int. Cl.
*B65C 1/02* (2006.01)
*B65C 9/42* (2006.01)
*B65C 9/30* (2006.01)
*G09F 3/10* (2006.01)
*C09J 7/35* (2018.01)
*C09J 7/21* (2018.01)
*B65C 9/00* (2006.01)

(56) References Cited

OTHER PUBLICATIONS

International Preliminary Report on Patentability dated Oct. 31, 2019 issued in corresponding IA No. PCT/US2018/028074 filed Apr. 18, 2018.

* cited by examiner

TRANSLUCENT HEAT SEAL MATERIAL FOR LOW TEMPERATURE APPLICATIONS

CROSS-REFERENCE TO RELATED APPLICATION

This application claims priority to and the benefit of U.S. Provisional Utility Patent Application Ser. No. 62/486,670 filed on Apr. 18, 2017, which is incorporated herein by reference in its entirety.

BACKGROUND

The present invention relates generally to a material suitable for use in product labeling and, more specifically, to translucent heat seal labels for relatively low temperature applications.

It is customary for manufacturers of garments and other finished goods to attach thereto one or more labels that display various items of information, such as article size, fiber content, and instructions for care. Such labels, which are to be contrasted with hanging price tags and the like, are typically not intended to be removed by the consumer after the purchase of the article, but rather, are intended to be permanently affixed to the article. In fact, such labels are commonly known in the industry as permanent care labels.

Such labels are also commonly used to indicate the manufacturer's name or trademark, branding information, the source of the goods, and other useful information for all kinds of products. Typically, natural or synthetic materials such as cloth, canvas, leather, and the like receive printing or stitching, and are then attached to the product by sewing, fasteners, or adhesives. However, most labels are manufactured from opaque or nontransparent materials which can detract from the aesthetic qualities of the product.

Some labels, such as iron-on or heat applied labels, use heat and pressure to activate glue or other adhesive materials to bond the label to the product. Proper adhesion is temperature, pressure, and time dependent. Temperatures in excess of 170 degrees Celsius are typically required to activate these adhesives to create an acceptable bond between the label and the product. Lower temperature adhesives may permit adequate bonding using a lower temperature application, but require either a higher contact pressure, or longer contact time requiring more energy input and/or increased production time to successfully attach the label to the product.

Thus, there exists a long felt need in the art for a material suitable for use as a heat seal label that is attachable to a product at a relatively low temperature and pressure in a relatively short timeframe, which also easily blends in with the product. The present invention discloses a substantially transparent label that is heat sealable to a product at relatively low temperatures over a relatively short timeframe. The present invention further discloses a method for applying such a label material to a product, such as footwear, clothing or other articles.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a label material useable for labeling a product. The label material preferably comprises a polyurethane web comprised of a top side and a back side, and an adhesive. The label material may further comprise a removable backing or liner.

In one exemplary embodiment, at least one printed indicia, such as brand information, the manufacturer's name or trademark, care instructions or any other useful information, may be printed onto the polyurethane web using a thermal printer. Once positioned adjacent to the product, the adhesive is then preferably activated using relatively low heat and pressure to bond the polyurethane web to the product, though other adhesive activation techniques are also contemplated and described herein. Additionally, the polyurethane web may be substantially transparent so that the polyurethane web substantially blends into the product once attached. The label material may also be partitioned into a plurality of individual labels, each attachable to a product.

In another exemplary embodiment, a method of applying the printed upon label material of the present invention to a product is described. The method preferably comprises the steps of: (i) supplying a roll of the label material to a printer; (ii) printing at least one indicia on a polyurethane web of the label material; (iii) removing a backing or liner from the polyurethane web to expose an adhesive; (iv) positioning the polyurethane web on the product at a desired location; and (v) activating the adhesive with heat and pressure, or other acceptable adhesive activation techniques, to bond the portion of the polyurethane web to the product, thereby forming an individual label attached to the product.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a label material for labeling purposes. The material is preferably translucent and substantially transparent when applied to materials such as leather, fabric, cloth, and the like. However, it is also contemplated that non-transparent, opaque, label stock could also be used to suit user preference.

The invention uses an adhesive that activates or reacts at relatively low temperatures with relatively low pressure applied thereto and over relatively short contact timeframes during bonding applications. The use of relatively low temperatures and pressures, and relatively short contact times is desirable for a number of reasons. First, lower temperatures and lower pressures typically mean a lower impact on the environment because less energy is being consumed and less carbon dioxide is being produced during the manufacturing process, as compared with traditional manufacturing techniques. Second, shorter contact periods to successfully bond the label to the product result in increased productivity and profitability, both of which are desirable.

The label material of the present invention is deployable for thermal transfer technology in combination with ink printers such as, but not limited to, a SNAP™ 500 Multi-Headed Care Label Printer with an external re-winder, presently manufactured and sold by Avery Dennison Corporation of Pasadena, Calif.

Figure 1:
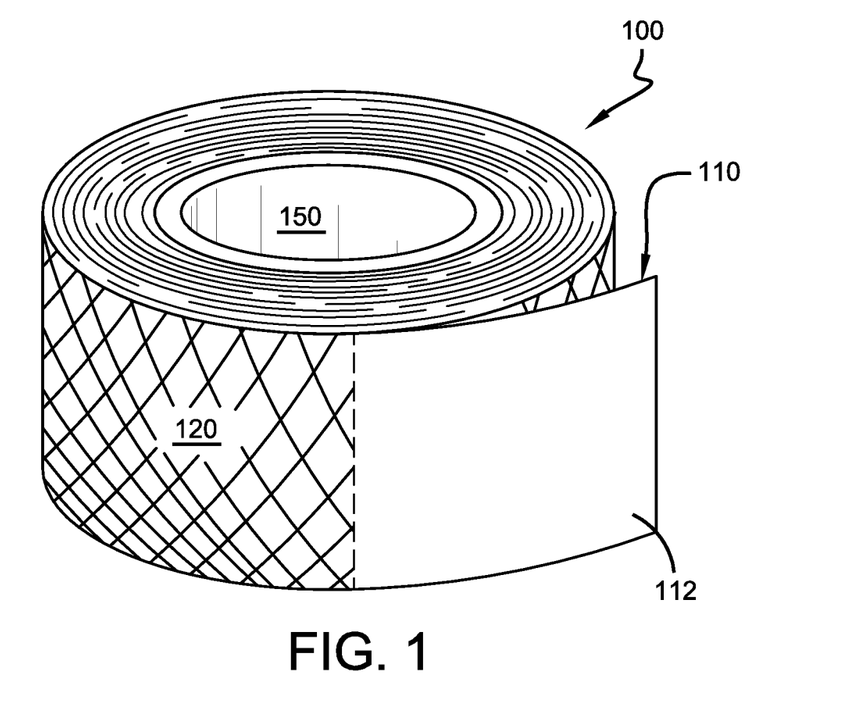
FIG. 1 illustrates a front perspective view of a label material in accordance with the disclosed architecture.

Referring initially to the drawings, FIGS. 1-6 illustrate a label material 100 for use in labeling a product 10 in accordance with the present invention. As best illustrated in FIG. 1, the label material 100 preferably comprises a polyurethane web 110 comprising a top side 120 and a back side 130. The polyurethane web 100 is typically manufactured from polyurethane resin. In one embodiment, the polyurethane web 100 is approximately 100 percent polyurethane resin, and is substantially free of any raw fabric or raw fabric tape on the top side 120. The use of a polyurethane web 100 with a top side 120 comprised substantially of a polyurethane resin is particularly useful for creating a resulting label 200 that is substantially translucent or transparent when applied to a product 10, such as clothing, footwear, or any other suitable article. Translucent/transparent labels are particularly desirable because they permit the non-printed portion of the label to better blend in with the product or article to which the label is attached, thereby resulting in a more aesthetically pleasing finished product as depicted in FIGS. 3A and B. Notwithstanding, it is also contemplated that the label material of the present invention could be employed with non-transparent, substantially opaque, label stock to suit user preference.

The label material 100 further comprises an adhesive or adhesive film 140 for bonding the polyurethane web 110 to the product 10 that reacts or activates at relatively low temperatures with less pressure and shorter contact timeframes than traditional manufacturing techniques, as described infra. The adhesive 140 may be coated, embedded, or otherwise applied to the back side 130 of the polyurethane web 110.

In one embodiment, the adhesive 140 is a polyurethane thermoplastic adhesive film, though it is contemplated that other adhesives used in relatively low temperature/short contact time applications may also be used as explained more fully infra. For example, other thermo-adhesive substrates may be used to achieve different performance or bonding parameters to suit user preference. When activated by heat and/or pressure, the adhesive 140 bonds or otherwise affixes the polyurethane web 110 portion of resulting label 200 to the product 10, as described more fully below.

It is contemplated that adhesive 140 could also be a melt adhesive, a solvent based adhesive, or an emulsion adhesive, and may include a styrene block copolymer based melt adhesive or an acrylic based emulsion adhesive to include copolymers of acrylic acid esters and optionally acrylic acid. The adhesive may be a permanent adhesive or a light tack adhesive. The permanent adhesive can be one of any of those known in the art including, but not limited to, acrylate, epoxy or plastic polymers. Additionally, as mentioned supra, the at least one adhesive may be a thermally activatable adhesive. The thermally activatable adhesive may be any of those known in the art including, but not limited to, polyester, acrylic or polyamide adhesives. Adhesive or adhesive liner 140 may be applied in a continuous layer to polyurethane web 110, or may be applied in a particular patterned arrangement.

It will be appreciated that although various preferred embodiments of the invention are directed to providing adhesives 140 that are transparent or translucent in appearance; the invention is also applicable in providing adhesives that are opaque or dark in appearance. Thus, for many applications in which the former type of adhesives find use, such adhesives are preferably free of additives, pigments, dyes, inks, and/or colorants such as for example, carbon black or graphite. And for the latter type of adhesives, such adhesives may contain one or more additives, pigments, dyes, inks, and/or colorants such as for example carbon black or graphite.

Another important attribute of activatable adhesives 140 is the ability of the adhesive to stay in an activated state, i.e., the adhesive is in a tacky state long enough to allow application of the label to a product 10 before the adhesive loses its tackiness. This time period is commonly referred to as the "open time" of the adhesive 140. Depending on the speed of application of the label 200 to product 10, and the distance between the activating device and the point where the label is applied to the product, this open time could be a fraction of a second and as long as several minutes or more. Embodiments of the adhesive 140 may be repositionable for approximately 60 seconds, e.g., one minute, after application of the label to the product 10 so that minor adjustments can be made to the label's position on the product immediately after application. Embodiments of the adhesive 140 form a permanent bond between the label 200 and the product 10 within approximately two minutes, after activation of the label, so that the label cannot inadvertently be removed from, or repositioned on, the product.

Other preferred adhesive systems that may be used generally comprise an adhesive base polymer, a plasticizer which preferably is in a solid crystalline state below the application temperature, and a solid tackifier which preferably is also in a solid state below the application temperature. The physical states of the adhesive material can be switched between solid and non-solid by altering the temperature. The open time of the adhesive can be controlled by adjusting the ratio of the components, i.e. the adhesive polymer base, the plasticizer, and the tackifier.

At the switching temperature of the adhesive, the properties of adhesion and viscosity markedly change. Therefore, an adhesive system can be thermally switched from "off" to "on" by using the strategies described herein. If such adhesive system is then coated on a facestock at a temperature below the designed switch temperature, the material is in its non-sticky solid state. Thus, the label construction can be wound in a roll form. During the application process, the temperature is increased to the switching temperature so that the material will change to a non-solid state and then exhibit its adhesive properties, which allow the label to be adhered to a substrate as desired as a result of increased adhesion properties. If the substrate exhibits a porous surface, the preferred embodiment adhesive systems will flow into the pores and "stick" very well, as a result of the interlocking effect even when the temperature is reduced below that of the switching temperature of the adhesive.

The present invention contemplates the use of a wide array of adhesives 140 having unique characteristics that enable the adhesives to be used in numerous applications. One feature of the adhesives relates to the relatively short time period required for activating the adhesive, i.e. selectively changing the adhesive from a non-tacky state to a tacky state. Fast activation times enable the adhesive 140 to be used in high speed labeling operations. This time period is oftentimes referred to as the adhesive's "activation time."

As previously described herein, the adhesives, once activated, remain in their activated state long enough to at least allow application of a label carrying the adhesive to an item or receiving substrate before the adhesive loses its tackiness. This characteristic is described herein as the "open time" of the adhesive. Once the adhesives 140 of the invention are activated, i.e. while in their "open" and tacky state, the adhesives 140 exhibit relatively high tackiness.

In addition, in certain embodiments, the adhesives 140 of the present invention are generally clear after activation to allow the passage of light without any detrimental absorbance, and to permit label 200 to better blend in with the product 10 to which it is attached. Preferably the adhesives 140, once activated, remain in a clear or at least substantially clear state for relatively long time periods and preferably for at least 1 year, and more preferably longer than 1 year.

In accordance with the present invention, it is found that, by controlling various factors including the molecular weight and molecular weight distribution of the base polymer, as well as the level of the multifunctional monomer of the base polymer by using a combination of multifunctional monomer and chain transfer material, a heat switchable adhesive that has superior properties of fast activation, high tack, long open time, and long lasting clarity is obtained. Upon heating, the activatable adhesive behaves as a typical pressure sensitive adhesive, and the property of tack can be maintained for a prolonged period of time, which allows the adhesive material to flow or wet-out on the targeted substrate surface for enhancing the adhesion.

By far, the most common adhesive activation schemes utilize heat activation, i.e., the activation of the label adhesive using heat. For heat activation, various other techniques could be used including, without limitation, heated drums or rollers, direct contact with the heating element, microwave energy, heated belts in contact with the adhesive, and infrared and near infrared radiation. In addition, general methods for heating using radio frequency energy, inductive heat, radiant heat, and visible light also are well known and could be applied to this list of activation methods.

The label material 100 may further comprise a removable backing 150. The removable backing 150 is typically an at least partially translucent material used to cover the back side 130 of the polyurethane web 110, thereby encapsulating the adhesive 140 between the polyurethane web 110 and the backing 150, and protecting the same prior to use. The adhesive bond between adhesive 140 and removable backing 150 is not as strong as the adhesive bond between adhesive 140 and the back side 130 of the polyurethane web 110 so that removable backing 150 is easily removed from the polyurethane web 110 by the printer, as described more fully below. This is true because adhesive 140 is typically not activated until removable backing 150 has been separated from adhesive 140 and the back side 130 of the polyurethane web 110.

Removable backing 150 may include a multilayer liner or may be a conventional liner including a single paper or film layer which may be supplied in roll form. In further embodiments, removable backing 150 may be coated with a release coating (e.g., a silicone), that may be, in some embodiments, dried or cured following application by any suitable means. In one embodiment, the removable backing 150 is comprised of polypropylene or polypropylene film and may be a translucent yellow in color, though it is also contemplated that other colors or materials may also be used without affecting the overall concept of the present invention.

For example, other useful release liners/backing materials include polyethylene coated papers with a commercial silicone release coating, polyethylene coated polyethylene terephthalate films with a commercial silicone release coating, or cast polypropylene films that can be embossed with a pattern or patterns while making such films, and thereafter coated with a commercial silicone release coating. For example, one particularly suitable release liner/backing is kraft paper, which has a coating of low density polyethylene on the front side with a silicone release coating and a coating of high density polyethylene on the back side. Other release liners/backing materials known in the art are also suitable as long as they are selected for their release characteristics relative to the pressure sensitive adhesive chosen for use in the present invention. The release liner/backing may also have a moldable layer of polymer under the release coating. The moldable layer may be, for example, a polyolefin such as, but not limited to, polyethylene or polypropylene. The surface of the release layer of the release liner/backing material may have a textured finish, a smooth finish, or a patterned finish. The release layer may have a randomly microstructured surface such as a matte finish, or have a pattern of three-dimensional microstructures. The microstructures may have a cross-section which is made up of circles, ovals, diamonds, squares, rectangles, triangles, polygons, lines or irregular shapes, when the cross-section is taken parallel to the surface of the release surface.

The release liner/backing 150 may further comprise a release coating on both sides; one side having a release coating of a higher release value than the release coating of the other side. The removable backing 150 may be a heavy weight liner or a thin, light weight liner. The thickness of a thin liner is typically less than the standard 2.5 mils (0.064 mm), but can also be less than 2.2 mils (0.060 mm), less than 2.0 mils (0.051 mm), less than 1.8 mils (0.042 mm), or less than 1.2 mils (0.030 mm).

Removable liner/backing material 150 may also be an ultrathin or ultra-light liner having a thickness of less than 1.02 mil (0.0254 mm), less than 1 mil (0.0254 mm), less than 0.92 mil (0.0233 mm), less than 0.8 mil (0.0203 mm), less than 0.6 mil (0.017 mm), less than 0.50 mil (0.013 mm), or equal to or less than 0.25 mil (0.00626 mm). Such liners are commercially available from manufacturers like Avery Dennison Corporation of Glendale, Calif.

Further, the removable backing/liner 150 has the added benefit of also adding structural support to the polyurethane web 110 as it awaits use, is handled by a user and/or is processed through a printer. More specifically, the removable backing 150 is removed or detached from the polyurethane web 110 prior to bonding during the printing/labeling process, as described more fully below.

Figure 2:
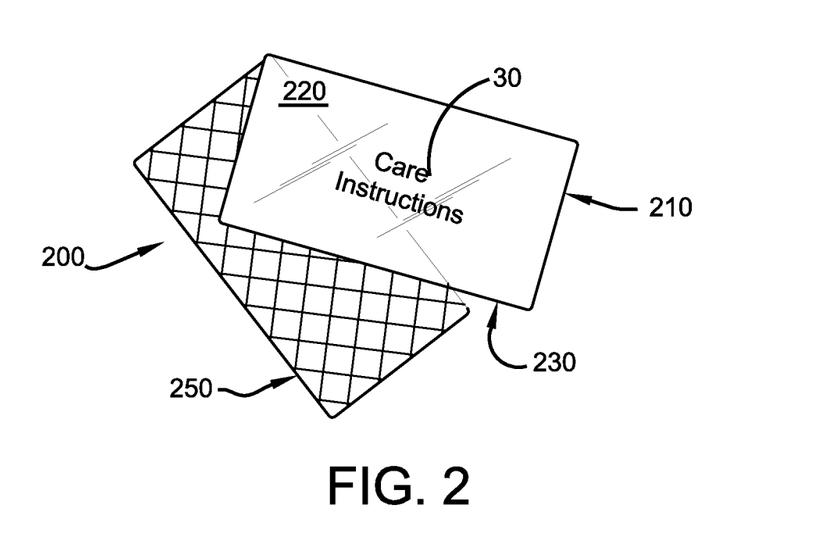
FIG. 2 illustrates a top perspective view of a label cut from the label material in accordance with the disclosed architecture.

After the removable backing 150 is peeled off, a portion of the polyurethane web 112 may be divided or cut into a plurality of individual labels 200, of whatever dimensions are desirable, as illustrated in FIG. 2. The portion of the polyurethane web 112 used to form a single label 200 is preferably secured or bonded to the product 10 using a relatively low temperature and pressure technique with a relatively short contact period. More specifically, a relatively low heat is used to melt adhesive 140, wherein the contact time is used to permit the melted adhesive 140 to flow onto product 10 and the applied pressure pushes the melted adhesive into product 10. Preferably, adhesive 140 can be activated at temperatures of less than 170 degrees Celsius for the environmental related reasons previously discussed. In one embodiment, the adhesive 140 activates at a temperature of approximately between 105 and 130 degrees Celsius with a contact time of substantially between four and six seconds when pressure is applied at a range of substantially between 1.3 and 1.5 kg/cm$^2$ to the portion of the polyurethane web 112 in contact with the product 10. It has also been determined that a pressure of 5 Bar works well with the label material of the present invention when used with similar temperature and contact time parameters.

Notwithstanding, the contact time and pressure needed for a successful bonding of resulting label 200 to a product 10 will vary in relation to the applied temperature and the type of substrate used, and the specific application settings are determined based on factors such as, but not limited to, product substrate composition, color, expected wash conditions, etc. The applied pressure is defined as the pressure that is directly applied to the label 200 and the platen of the printer 20 at the point of application to the product 10 where:

$$\text{Applied Pressure} = \frac{3.14 \times \text{piston radius}^2 \text{ (cm}^2\text{)} \times \text{air pressure (kg/cm}^2\text{) into cylinder}}{\text{Platen Size (cm}^2\text{)}}$$

The dwell or contact time is the length of time the pressure is exerted on the label 200 in contact with the product 10, and should be measured from the exact moment the printer application head makes contact with label 200 on product 10. Notwithstanding, as discussed supra, other adhesive 140 activation techniques are also contemplated to be within the scope of the present invention.

Figure 3A:
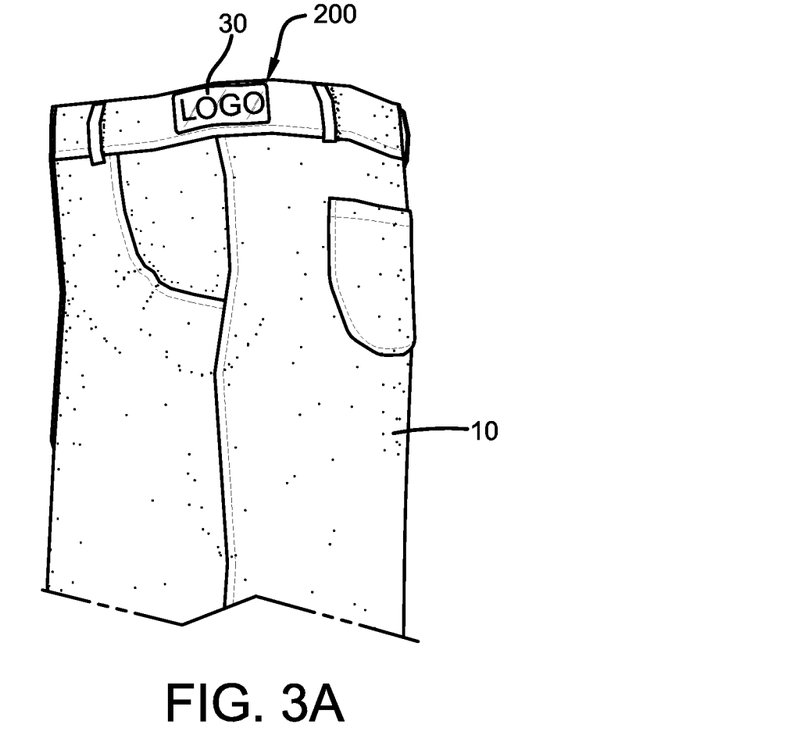
FIG. 3A illustrates a top view of the label secured to an article of clothing in accordance with the disclosed architecture.
Figure 3B:
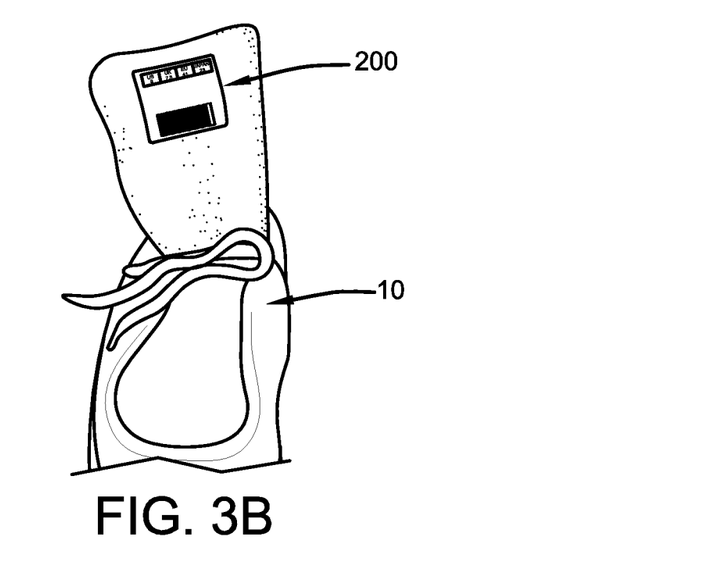
FIG. 3B illustrates a front perspective view of the label secured to an article of footwear.

As illustrated in the FIGS., the label material 100 is capable of accepting at least one printed indicia 30 from a printer 20. The at least one printed indicia 30 is preferably printed on the top side 120 of label material 100, and is typically accomplished by flexographic printing, inkjet printing, electrostatic printing, thermal printing technology or the like, or by any other suitable technique known to one of skill in the art for producing indicia on a surface. The printed indicia 30 may comprise a brand, branding information, images, logos, letters, numbers, themes, images, care instructions, or virtually any other wording, symbol or communication that would be desirable to be printed on a tag or label. Additionally, as the polyurethane web 110 portion of the resulting label 200 and adhesive 140 may be substantially transparent when bonded to the product 10, only the printed indicia 30 will appear readily visible, thereby creating a clean and aesthetically appealing effect on the product 10, as illustrated in FIGS. 3A and B.

FIG. 2 depicts an individual label 200 of the present invention comprised of a polyurethane web portion 210 capable of accepting at least one printed indicia 30 and comprising a top side 220 and a bottom side 230. The label 200 further comprises an adhesive 140 for attaching the polyurethane web portion 210 to the product 10. As described supra, adhesive 140 may be temperature activated by any suitable activation technique described herein. Each label 200 may further comprise a removable backing portion 250 that both covers and protects the adhesive 140 that is removable prior to bonding the polyurethane web portion 210 to the product 10. The adhesive 140 is activated as described supra.

As previously mentioned, printer 20 is typically a label printer, ink printer, or thermal printer similar to the exemplary SNAP™ 500 Multi-Headed Care Label Printer, presently manufactured and sold by Avery Dennison Corporation of Pasadena, Calif. The printer 20 preferably uses an external re-winder to collect and coil the removable backing 150 as it is removed from the polyurethane web 110 during application of label 200 to product 10.

Figure 4:
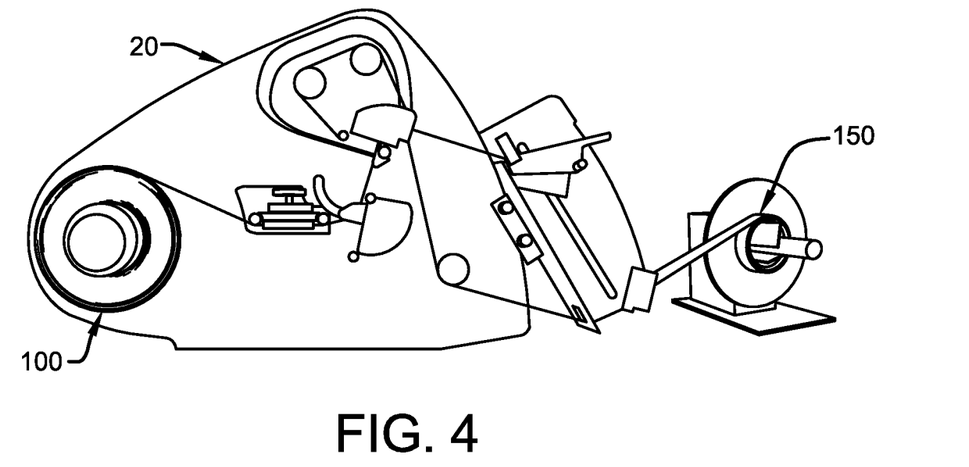
FIG. 4 illustrates a side view of the label material threaded onto a printer in accordance with the disclosed architecture.
Figure 5:
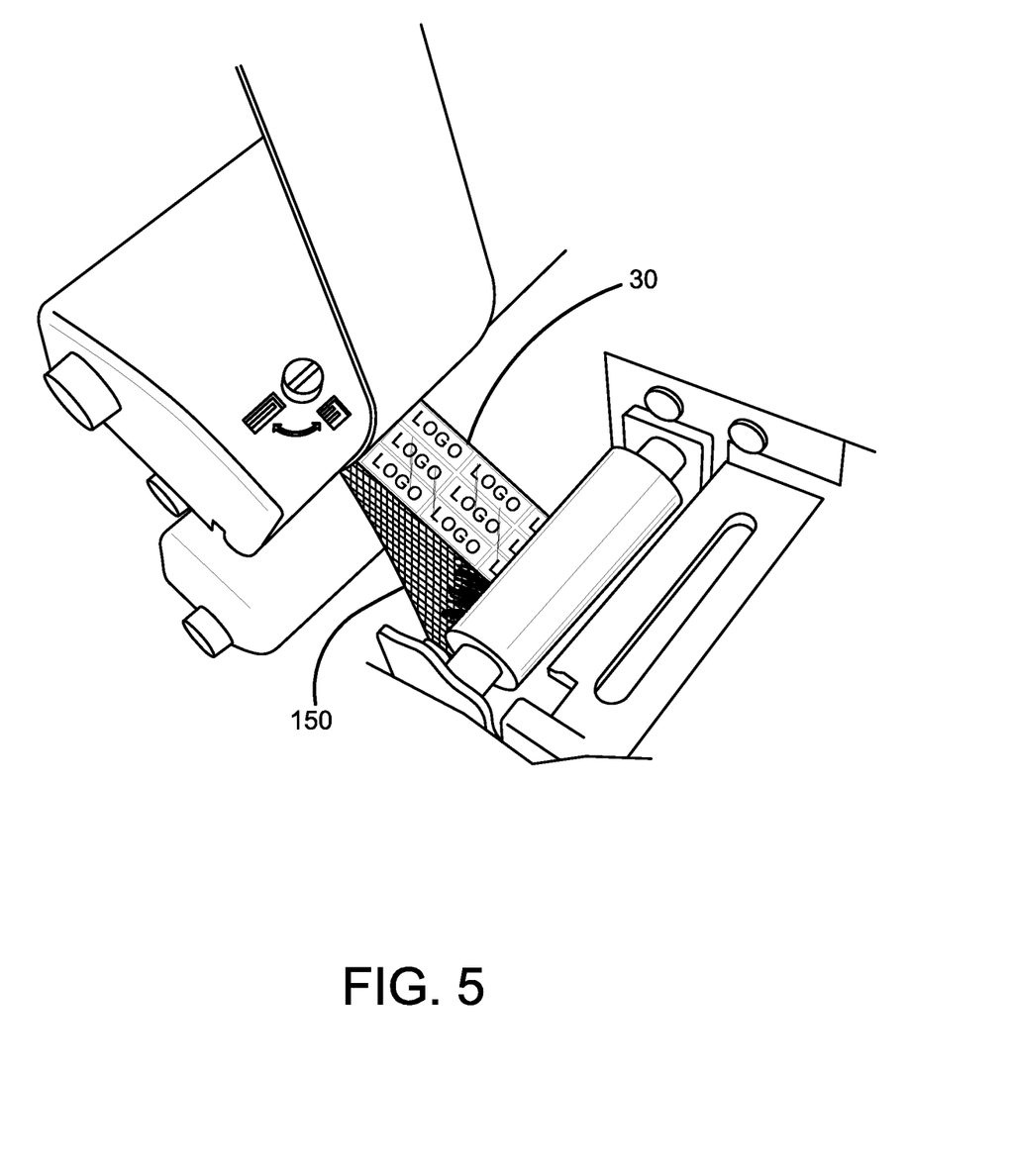
FIG. 5 illustrates an overhead view of the label material threaded onto the printer in accordance with the disclosed architecture.
Figure 6:
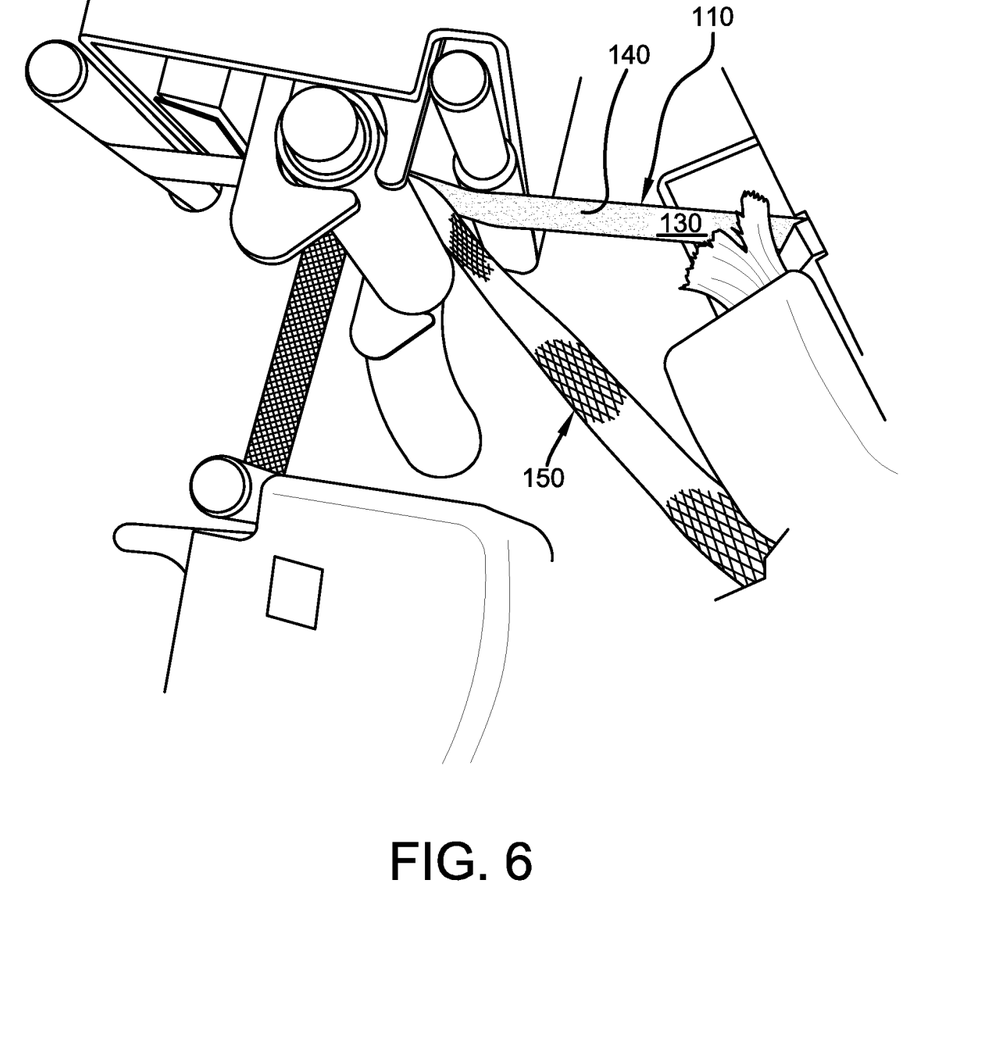
FIG. 6 illustrates an underneath perspective view of the label material threaded onto the printer in accordance with the disclosed architecture.

Having described an exemplary structure of the label material 100 and the plurality of individual labels 200, a method of applying the individual labels 200 to a product 10 will now be described. As illustrated in FIGS. 4-6, the label material 100 is typically stored as a roll of material. The roll is fed into the printer 20 and at least one printed indicia 30 is printed on the polyurethane web 110 of the label material 100 by said printer. Then, the backing 150 is removed from the polyurethane web 110 by printer 20 to expose adhesive 140. As the backing 150 is removed it is preferably simultaneously re-wound on a printer coiler as the polyurethane web 110 advances through the printer 20. A portion of the polyurethane web 112 with the at least one printed indicia 30 is cut off of the polyurethane web 110 to form at least one individual label 200, which is positioned at a desired location on the product 10. Then the at least one individual label 200 is bonded or applied to the product 10 by activating the adhesive 140 using the heat, contact time and pressure parameters discussed supra, or another acceptable adhesive activation technique.

More specifically, in one embodiment of the present invention, a temperature of approximately between 105 and 130 degrees Celsius may be applied to the individual label 200 positioned on the product 10 at a pressure of approximately between 1.3 and 1.5 kg/cm$^2$ for approximately between four to six seconds. Once attached, the individual label 200 will appear to be largely invisible with only the printed indicia 30 being readily discernable from the product to which label 200 is attached. The resulting label 200 of the present invention is capable of holding complex SKU information and is capable of adhering to a wide range of products and substrates including, without limitation, natural or synthetic materials such as cloth, canvas, leather, and the like.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A label material comprising:
    a polyurethane web comprised of a top side and a back side;
    an adhesive applied to the back side; and
    a removable backing;
    wherein the polyurethane web is comprised of a polyurethane resin;
    wherein the adhesive is a polyurethane thermo-adhesive; and
    wherein the adhesive has a melting temperature of less than 170 degrees Celsius.

2. The label material of claim 1 wherein the polyurethane resin is substantially free of raw fabric.

3. The label material of claim 1, wherein the polyurethane web is substantially transparent.

4. The label material of claim 1, further comprising at least one printed indicia printed onto the polyurethane web.

5. The label material of claim 4, wherein the at least one printed indicia is printed on the top side of the polyurethane web.

6. The label material of claim 4, wherein the at least one printed indicia comprises at least one of: a brand, an image, a logo, a theme, or a set of care instructions.

7. The label material of claim 1, wherein the adhesive is positioned between the back side and the removable backing.

8. The label material of claim 1, wherein the polyurethane web is bonded or applied to a product.

9. The label material of claim 1, wherein a portion of the polyurethane web is divided or cut into a plurality of individual labels.

10. A method of applying a label material to a product comprising the steps of:
    supplying the label material to a printer;
    printing at least one indicia on a polyurethane web of the label material;
    removing a backing from the polyurethane web to expose an adhesive;
    cutting the polyurethane web into a plurality of individual labels;
    positioning at least one of the plurality of individual labels on the product; and
    activating the adhesive;
    wherein the polyurethane web is comprised of a polyurethane resin;
    wherein the adhesive is a polyurethane thermo-adhesive;
    wherein activating the adhesive comprises applying heat and pressure to the at least one of the plurality of individual labels; and
    wherein the heat is less than 170 degrees Celsius.

11. The method of claim 10, wherein the at least one of the plurality of individual labels is substantially translucent except for the at least one indicia printed thereon.

12. The method of claim 10, wherein the at least one printed indicia comprises at least on of: a brand, an image, a logo, a theme, or a set of care instructions.

13. The method of claim 10, wherein the pressure is within a range of between 1.3 and 1.5 kg/cm$^2$.

14. A label attachable to a product comprising:
    a polyurethane web portion comprised of a top side and a back side;
    an adhesive for attaching the polyurethane web portion to the product; and
    a removable backing portion;
    wherein the polyurethane web is comprised of a polyurethane resin;
    wherein the adhesive is a polyurethane thermo-adhesive; and
    wherein the adhesive has a melting temperature of less than 170 degrees Celsius.

15. The label of claim 14, wherein the polyurethane web portion comprises at least one printed indicia.

* * * * *